US008980356B2

(12) United States Patent
Mecklai

(10) Patent No.: US 8,980,356 B2
(45) Date of Patent: Mar. 17, 2015

(54) PROCESS AND APPARATUS FOR MAKING IMPROVED SAMOSA-PASTRY AND PATISSERIE PRODUCTS

(76) Inventor: Reza Mecklai, Newmarket (CA)

( * ) Notice: Subject to any disclaimer, the term of this patent is extended or adjusted under 35 U.S.C. 154(b) by 149 days.

(21) Appl. No.: 11/718,024

(22) PCT Filed: Sep. 18, 2006

(86) PCT No.: PCT/CA2006/001531
§ 371 (c)(1),
(2), (4) Date: Apr. 26, 2007

(87) PCT Pub. No.: WO2007/033470
PCT Pub. Date: Mar. 29, 2007

(65) Prior Publication Data
US 2009/0136631 A1     May 28, 2009

(30) Foreign Application Priority Data
Sep. 20, 2005 (CA) .................................. 2520333

(51) Int. Cl.
*A21D 8/06* (2006.01)
*A21D 13/00* (2006.01)
*A21D 6/00* (2006.01)
(Continued)

(52) U.S. Cl.
CPC ............ *A21D 13/0025* (2013.01); *A21D 6/001* (2013.01); *A21D 8/06* (2013.01); *A21D 13/0006* (2013.01)
USPC ........... 426/556; 426/138; 426/497; 426/418; 426/302; 99/352; 99/467; 99/468; 219/201; 122/13.01

(58) Field of Classification Search
CPC ....... A21D 13/0006; A21D 8/06; A21B 3/04; A21B 3/131; A21B 1/50

USPC ............ 426/138, 497, 418, 302, 556; 99/352, 99/467, 468; 219/401; 122/13.01; 126/5, 126/20
See application file for complete search history.

(56) References Cited

U.S. PATENT DOCUMENTS 1,544,481 A * 6/1925 Reese .............................. 126/20
2,768,505 A * 10/1956 Goodwin ........................ 62/187
(Continued)

FOREIGN PATENT DOCUMENTS

CA      2458994     3/2003
EP      0824863 A2     2/1998
(Continued)

OTHER PUBLICATIONS

Dharmakshetra. 2003. Breads. Accessed online: http://web.archive.org/web/20030530072755/http://dharmakshetra.com/prasadam/Breads.htm. p. 2.*

(Continued)

*Primary Examiner* — Humera Sheikh
*Assistant Examiner* — Saeeda Latham
(74) *Attorney, Agent, or Firm* — Jeffrey S. Melcher; Manelli Selter PLLC

(57) ABSTRACT

An improved method of making a baked pastry, particularly, a shell or wrap for a samosa from a pastry dough in a convection baking oven having a convection atmosphere, the method comprising baking the dough in the oven at a baking temperature for a baking period of time, the improvement having the convection atmosphere with a sufficiently moist atmosphere for the duration of the baking time to prevent the pastry from becoming dry.

16 Claims, 4 Drawing Sheets

(51) Int. Cl.
   *A21B 3/04* (2006.01)
   *A21D 10/02* (2006.01)

(56) References Cited

U.S. PATENT DOCUMENTS

| | | | | |
|---|---|---|---|---|
| 2,965,500 | A | * | 12/1960 | Sanger .......................... 426/124 |
| 3,151,987 | A | * | 10/1964 | Colby ........................... 426/274 |
| 3,295,989 | A | * | 1/1967 | Matz et al. .................... 426/331 |
| 3,384,036 | A | | 5/1968 | Lawnicki |
| 3,556,798 | A | * | 1/1971 | Tucker et al. ................. 426/275 |
| 4,411,920 | A | * | 10/1983 | Fenoglio ....................... 426/233 |
| 4,651,635 | A | * | 3/1987 | Ally .............................. 99/450.6 |
| 4,924,072 | A | | 5/1990 | Oslin |
| 4,978,548 | A | | 12/1990 | Cope |
| 5,221,546 | A | * | 6/1993 | Moore et al. .................. 426/275 |
| 5,595,109 | A | * | 1/1997 | Shelton ........................... 99/476 |
| 5,694,835 | A | | 12/1997 | Mangina |
| 5,938,959 | A | | 8/1999 | Wang |
| 2002/0096129 | A1 | | 7/2002 | Mach |
| 2003/0203091 | A1 | * | 10/2003 | Hayes-Jacobson ........... 426/549 |
| 2004/0011208 | A1 | * | 1/2004 | Sung et al. ....................... 99/327 |
| 2005/0051036 | A1 | | 3/2005 | Erdmann |

FOREIGN PATENT DOCUMENTS

| | | |
|---|---|---|
| EP | 1413832 A2 | 4/2004 |
| EP | 1832172 A1 | 9/2007 |
| FR | 2699650 A1 | 6/1994 |
| JP | 8275716 * | 10/1996 |
| WO | 2007055677 A2 | 5/2007 |
| WO | 2007105947 A1 | 9/2007 |

OTHER PUBLICATIONS

Wikipedia. 2010. Cup (unit). Accessed online: http://en.wikipedia.org/wiki/Cup_(unit). pp. 4-5.*

Wing. 1999. The Bread Builders. Chelsea Green Pubs. pp. 74-76.*

Cook's Thesaurus. 2003. Food Wrappers. Accessed online: http://web.archive.org/web/20030212092055/www.foodsubs.com/Wrappers.html. p. 7.*

Rao et al. 1986. Test Baking of Chapati-Development of a Method. Cereal Chem. 63(4):297-303.*

Faridi et al. 1982. Functional (Breadmaking) and Compositional Characteristics of Iranian Flat Breads. J Food Sci, 47:926-927.*

Fujisawa et al., JP 8275716 (Derwent Abstract).*

Emil Braun. 1917. Secrets of Bread Making and Economy and System in the Bakery: A Handy Manual of Up-to-date Money-saving Suggestions and Form-sheets for Small and Large Bakeries, the Result of Years of Study and Practical Experiments (Google eBook) Bakeries, Part 5, p. 21. Accessed online.*

Supplementary European Search Report (for corresponding European application) completed Sep. 20, 2011.

* cited by examiner

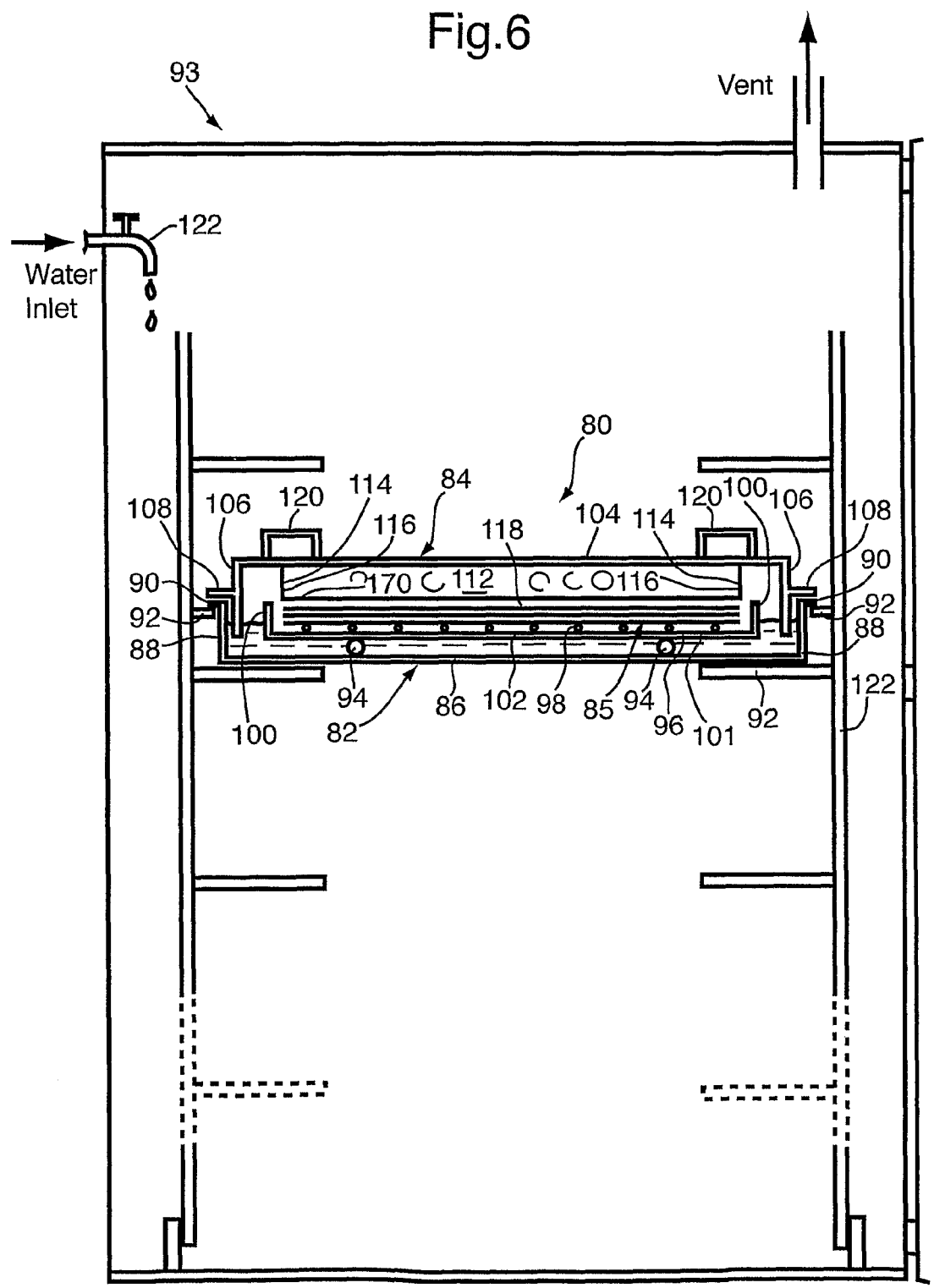

PROCESS AND APPARATUS FOR MAKING IMPROVED SAMOSA-PASTRY AND PATISSERIE PRODUCTS

CROSS-REFERENCE TO RELATED APPLICATIONS

This application is a national stage entry under 35 U.S.C. 371 of International Application No. PCT/CA2006/001531, filed 18 Sep. 2006 designating the United States. This application claims foreign priority under 35 U.S.C. 119 and 365 to Canadian Patent Application No. 2,520,333, filed 20 Sep. 2005. The complete disclosures of these applications are incorporated herein by reference.

FIELD OF THE INVENTION

This invention relates to processes for making samosa-pastry dough and patisserie products, particularly pastry shells and wraps for classic samosas; and apparatus of use in said processes; and said products.

BACKGROUND TO THE INVENTION

Samosa chapris or wraps like those for other similar foods e.g. turn-overs, pies, pasta etc. are characterized by unleavened, thinly sheeted dough pastry that may be semi-cooked, in the case of egg rolls or samosas used raw prior to cooking, in the case of pies, or hardened prior to boiling, in the case of pasta, and then used for covering or layering the product that normally consisted of meat, vegetables, spices, dry fruits, nuts, and the like.

Authentic, classic samosas are described as samosas originating from Gujerati speaking enclaves of South Asia and are characterized by a single, thinly sheeted dough pastry that is pre-cooked to a degree, and then used for assembling samosas. The traditional art for doing this is slow and time consuming as the pastry could only be cooked one at a time. The final product was also quick to dry out, inconsistent in its physical and chemical compositions and, therefore, problematic to work with in terms of a business dedicated to industrializing and commercializing the art of producing authentic, classic samosas.

The other broad category of samosas is known as Punjabi samosas originating from Punjabi speaking enclaves of South Asia that are characterized by a single, thickly sheeted dough pastry that is uncooked and is used for assembling samosas.

Unfortunately, at present, commercial pastry of use as shells and wraps for these samosas or similar products do not measure up to the quality characteristics associated with traditional authentic classic samosa pastry, such as, for example, the degree of crunchiness, elasticity, pliability, non-porous and smooth surface, moisture and oil content, inter-connected as they all are, and pastries that are also quick to peel.

Accordingly, there is a need for a new way of producing novel pastry shells to wrap traditional, authentic, classic samosas that have the quality expected of traditional samosas and which can be manufactured in an improved batch or continuous process in a mass produced manner.

SUMMARY OF THE INVENTION

It is an object of the present invention to provide a process for the mass-production of a pastry used to wrap authentic, classic samosas that is made with wheat or other type of flour and prepared in such a manner as to accomplish a number of the aforesaid desirable characteristics that includes a crispy and crunchy eating quality, a non-porous, non-greasy appearance, that is also not crumbly or dry, but in fact, appears polished, and has an extended shelf life. Intermediary and final products made with the pastry according to the invention, whether they are stored frozen, refrigerated or at ambient temperatures have a utility that allows their use in assorted varieties of main menu, appetizers and snack food products in various forms.

It is a further object to provide apparatus of use in said aforesaid process.

It is a further object to provide pastry products of said process and apparatus.

Accordingly, in one aspect, the invention provides an improved method of making a cooked pastry from a pastry dough in a convection baking oven having a convection atmosphere, the method comprising cooking the dough in the oven at a cooking temperature for a cooking period of time, the improvement comprising cooking the pastry and maintaining the convection atmosphere at a sufficiently moist atmosphere for the duration of the cooking time to prevent the pastry from losing moisture while in a semi-cooked state.

Preferably, the cooking temperature is selected from 450° F.-485° F. and a cooking time of about 90 minutes.

The terms "baking" or "cooking" in this specification in relation to the processes according to the invention means a heating process effected in the presence of a sufficiently moist atmosphere as herein defined.

It is highly desirable that the baking pastry does not become dry.

In a further aspect, the invention provides an improved method of making a baked pastry from a pastry dough in a convection baking oven having a convection atmosphere, the method comprising baking the dough in the oven at a baking temperature for a baking period of time, the improvement comprising maintaining the convection atmosphere having at least 50%, preferably at least 70%, humidity for the duration of the baking time.

The humidity may be maintained by the introduction of water vapour during the baking step into the oven, either as a slow injection of steam, water droplets or vapour during the baking period.

Alternatively and preferably, the humidity is maintained by the generation of water vapour, heated as to constitute steam, from a water reservoir within the oven.

Preferably, the pastry dough is in the form of a sheet having a thickness selected from 0.2 mm to 3 cm, and more preferably, the sheet is of a desired width of between 40-60 cm, and a length selected from 10 cm to 20 m, suitably rolled on or as a spool, if appropriate and desired.

More preferably, the dough is in the form of a stack comprising a plurality of the sheets, one upon another, wherein each of the sheets has a thickness selection from 0.2 mm to 3.0 mm.

In preferred embodiments, the stack is formed from a single folded sheet wherein the sheet is folded longitudinally upon itself at least once to produce a folded stack.

More preferably, a process as hereinabove defined, further comprises (i) providing a baking pan assembly comprising water-containing reservoir means for operably releasing water vapour into said convection atmosphere during said baking;

(ii) placing said pastry dough in said baking pan assembly; and (iii) locating said baking pan assembly within said oven.

The reservoir means may comprise an upper and/or lower water reservoir, which operably contains sufficient water to provide the humidity during the baking period.

The processes as hereinabove defined are most valuable when preferably used with a novel pastry, which is made, stored and treated in a manner, which maintains desired amounts of moisture as to not become dry.

Accordingly, the invention in a preferred aspect provides a process as hereinabove defined wherein the baking pan assembly comprises an upper water-containing reservoir, and a lower water-containing reservoir.

Preferably, the dough is stored at a temperature selected from about 2° to 8° C., preferably, 2° to 6° C.; and the tempering container is formed of a plastics material, for example, polyethylene in the form of a bag, tube or other container.

In a further aspect, the invention provides a process of making a novel pastry dough for use as a shell or wrap for samosas, said process comprising said stored dough is at a temperature selected from 2° to 6° C.

Preferably, the admixture comprises 62-68% w/w flour, 1-4% w/w salt and the balance to 100% w/w of water.

Most preferably, the admixture consists essentially of 65% flour, 33% water, 2% salt.

In a further aspect, the invention provides wherein the means for providing the humidity comprises water addition means.

The means for providing and maintaining the desired humidity may comprise water addition means whereby water operably enters the oven as steam, water droplets or vapour, through inlet conduit means.

In a preferred embodiment, the oven comprises water reservoir means containing sufficient water for the duration of the baking period.

In a further aspect, the invention provides an apparatus for the manufacture of a cooked pastry from a pastry dough, said apparatus comprising a convection baking oven assembly having
(i) a cooking chamber for receiving and cooking said pastry dough operably at a cooking temperature for a cooking period of time and having a convection atmosphere, and
(ii) means for providing said convection atmosphere with a sufficiently moist atmosphere for the duration of said cooking time to prevent said pastry from becoming dry.

Preferably, the apparatus comprises means for providing said convection atmosphere with a humidity of at least 50% for said cooking period of time.

Preferably, said means for providing said humidity comprises water addition means.

Preferably, said means for providing said humidity comprises water reservoir means within said chamber.

Preferably, the apparatus comprises portable baking tray assembly means comprising a cooking tray and said water reservoir means transportable with said tray.

Preferably, the apparatus comprises means wherein said cooking tray has a plurality of perforations and is disposed above a lower water-reservoir whereby water vapour operably passes through said perforations to maintain said humidity.

Preferably, the apparatus comprises means wherein said assembly further comprises an upper water-reservoir above said baking tray.

Preferably, the apparatus comprises means wherein said assembly further comprises a sheet of silicone Bakers paper upon which said pastry dough rests during said cooking period.

Preferably, the apparatus comprises means wherein said assembly further comprises a sheet of silicone Bakers paper covering said pastry dough during said cooking period.

In a further aspect, the invention provides an apparatus for the manufacture of a samosa shell or wrap.

In a further aspect, the invention provides a pastry dough produced by a process comprising intimately mixing dough ingredients comprising an admixture consisting essentially of the following ingredients in said ratios 62-68% w/w flour, 28-37% w/w water, and 1-4% w/w salt to produce a relatively non-sticky pastry dough of desired consistency.

In a further aspect, the invention provides a pastry dough wherein said admixture consists essentially the following ingredients in said ratios of 65% w/w flour: 33% w/w water and 2% w/w salt.

In a further aspect, the invention provides a pastry dough wherein said flour has a gluten content of at least 13%.

In a further aspect, the invention provides a pastry dough as hereinabove defined of use in the manufacture of a samosa shell or wrap.

In a further aspect, the invention provides a sheet of pastry dough for baking in a convection oven for use as a samosa shell or wrap said process further comprising
cooling said dough to a temperature selected from 4° to 12° C.;
storing said dough in a sealed tempering container at a temperature of less than 10° C. for at least 8 hrs; and
rolling and cutting said tempered dough to a sheet of desired dimensions.

In a further aspect, the invention provides a baked pastry produced by a method and having a moisture content of 25-35% w/w water.

In a further aspect, the invention provides a pastry having a moisture content of 29-31% w/w water.

In a further aspect, the invention provides apparatus as hereinabove defined further comprising a baking pan assembly containing pastry dough and comprising water reservoir means to operably provide water vapour to produce the desired humidity during the baking period.

In preferred embodiments, the baking pan is located above and/or below containers containing the water such that the pastry dough is above, below or between the adjacent reservoir(s), in the baking pan assembly, which may be transportable as a whole to, within and out of the oven.

In more preferred embodiments the assembly further comprises an upper water-reservoir above the baking tray.

In a further aspect, the invention provides a cooked pastry product produced having a moisture content of 25-35% w/w water, preferably, 28-30% w/w water by a method as hereinabove defined.

In most preferred embodiments of a method according to the invention, the surface of the dough sheet is treated with a natural edible oil, such as, for example, olive oil or, most preferably, a vegetable oil, such as canola oil. The oil may be applied, for example, as a spray or by means of a brush. I have found that the oil both facilitates the separation of the layers of the stacked dough sheets after baking and assisting in maintaining the moisture content of the dough layers during the baking process.

Although the prior art teaches the admixture of oil during the dough preparation stage, the present invention, preferably, does not have such admixed oil/dough for baking. Surprisingly, I have found that dough sheets coated with oil in the preferred embodiments of the invention, after baking provide a pastry wrap or shell, which when formed into a samosa with an appropriate, desired filling does not produce surface bubbles or a greasy product according to the prior art, but rather a desirable, crispy samosa, when fried.

Thus, in a further aspect the invention provides a method as hereinabove defined comprising coating said dough with a natural edible oil prior to said baking.

Preferably, the vegetable oil is canola oil.

In a further aspect, the invention provides a cooked pastry product produced by a method as hereinabove defined.

BRIEF DESCRIPTION OF THE DRAWINGS

In order that the invention may be better understood, preferred embodiments will now be described, by way of example only, with reference to the accompanying drawings wherein

FIG. 6 is a diagrammatic vertical sectional view of a baking tray assembly in a convection oven, according to the invention.

DETAILED DESCRIPTION OF PREFERRED EMBODIMENTS

Figure 1:
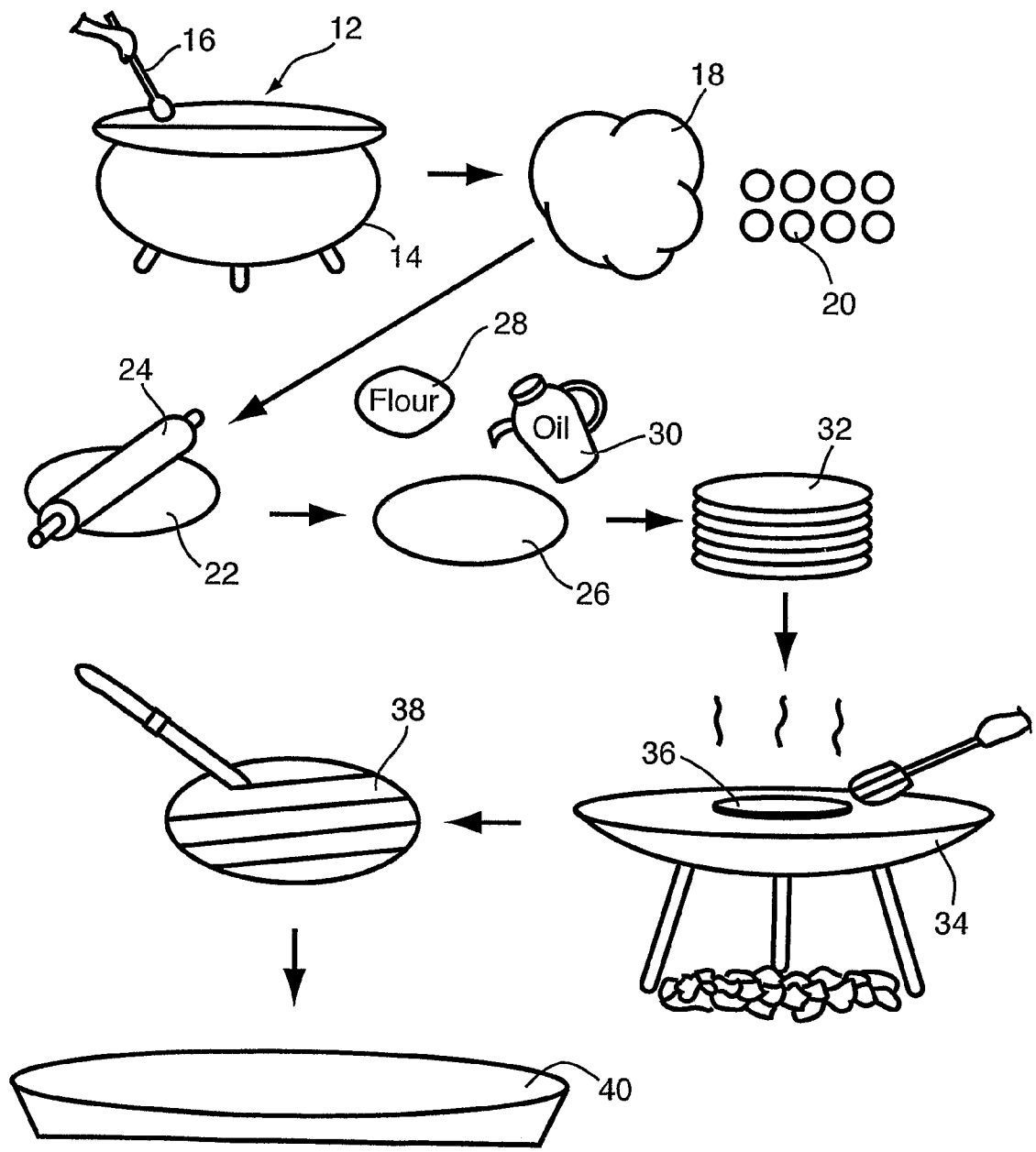
FIG. 1 is a flow chart of the steps in manually making authentic classical samosa shells or pastry wraps, according to the prior art.

With reference to FIG. 1, this shows generally the typical eight steps in making classical samosa pastry.

Typical ingredients, namely, flour, water, oil and salt, herein collectively 12 are manually mixed in bowl 14 by spoon 16, to a dough 18. Dough 18 is kneaded and formed into a plurality of 5 cm diameter dough balls 20 which are each then flattened to individual 10 cm diameter "flats" 22 by rolling pin 24. Two flats 22 are combined and rolled together to form an approximately 20 cm diameter resultant flat 26.

Flat 26 is conditioned by a light dusting of flour 28 and sprayed with cooking oil 30. A layered stack 32 of eight conditioned flats is formed and cooked on a pan 34 at a low heat with periodic flipping and peeling of the layer every minute to form cooked stack 36. Each cooked layer of stack 36 is sliced into strips 38 and wrapped in a moist cloth 40 and stored.

Figure 2:
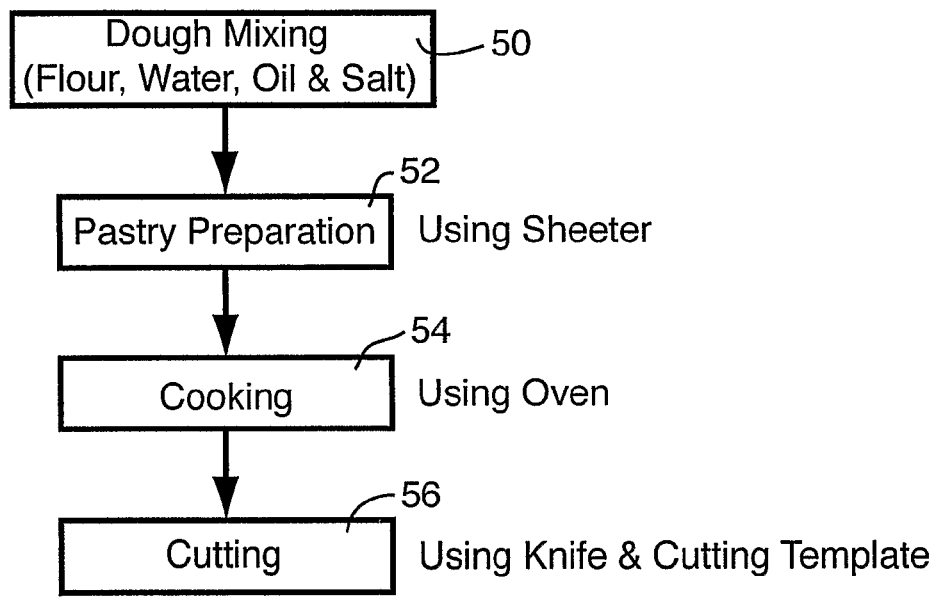
FIG. 2 is a flow chart of the steps in a semi-mechanized method for the mass production of pastry wraps of use in making classical samosas according to the prior art.
Figure 3:
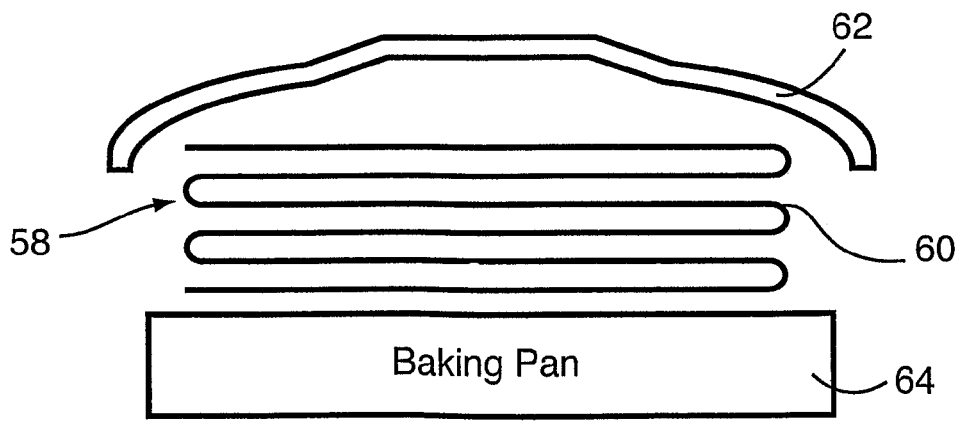
FIG. 3 is a diagrammatic representation of layered pastry folded in a baking pan prior to baking in the process of FIG. 2.

FIG. 2 represents a semi-mechanized process for the mass production of dough for wraps, for samosas comprising the steps of mixing aforesaid ingredients 12 in a mixer 50 to provide prepared dough using a sheeter 52, cooking in oven 54, and, subsequently, suitable cutting thereof with a knife and cutting template 56. Cooking is done with regular baking pans and a convection oven. However, with reference to FIG. 3, the sheeted pastry 58 is first layered in folds 60, covered in a muslin cloth 62, prior to cooking in baking pan 64 having dimensions of 65 cm long and 30 cm wide.

Figure 4:
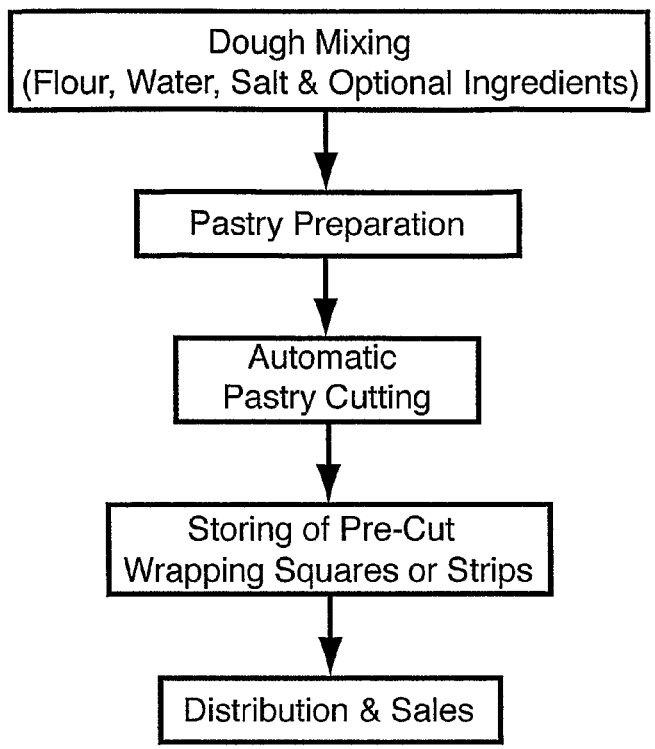
FIG. 4 is a flow chart of the steps in a fully mechanized method of making pastry for use in samosas and similar products, according to the prior art.
Figure 5:
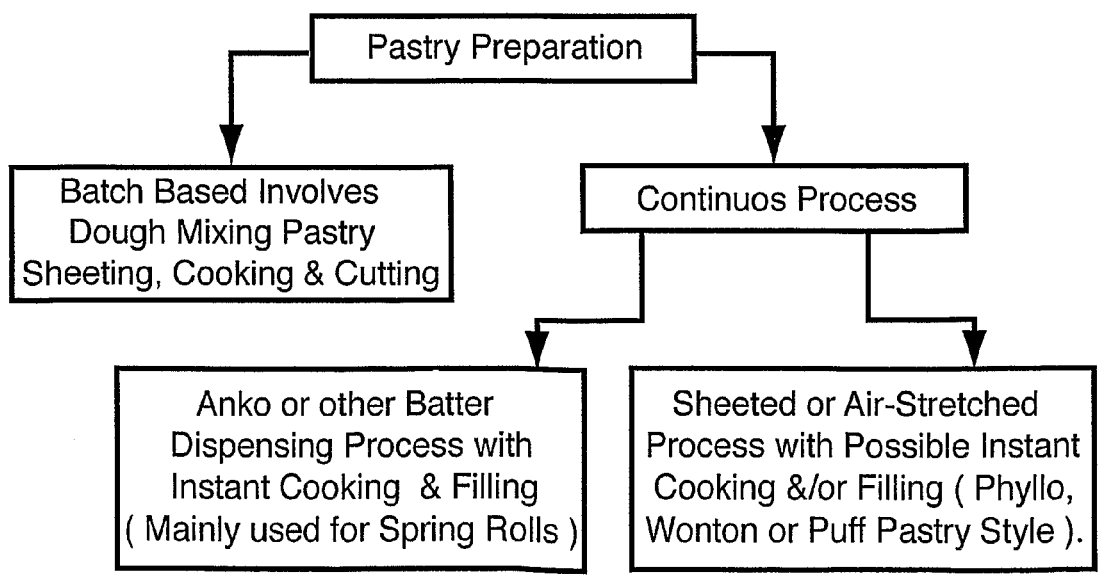
FIG. 5 is a flow chart of the steps of the process of FIG. 4 showing optional steps in use of the pastry preparation stage.

FIGS. 4 and 5 represent flow charts of a prior art fully mechanized method having the steps so-named therein.

FIG. 6 shows generally as 80 a rectangular cooking tray assembly having a lower stainless steel reservoir 82, an upper steel reservoir 84 and therebetween a steel dough sheet tray 85.

Lower reservoir 82 has a base 86 and upstanding sides 88 having a pair of upper lips 90 on opposite sides, which rests on inside frame members 92 of oven shown generally as 93, as hereinbelow described. On the inside and extending the length of base 86 is a pair of solid steel cylindrical support bars 94 upon which rests dough sheet tray 85.

Dough sheet tray 85 has a tray base 96 having a plurality of water vapour vent holes 98 and upstanding vertical sides 100. A sheet of silicone Bakers paper 101 upon which rests a stack 102 of twenty-four dough sheets of approximately 0.3 mm thick.

Upper steel reservoir 84 comprises a planar cover base 104 having downwardly directed sides 106 having a pair of bottom lips 108 mid-way of opposing sides complementary of lips 90 whereby lips 108 rest on lips 90 to support reservoir 84.

Vertical sides 106 extend beyond lips 108 into reservoir 82 between sides 88 and 100.

Extending downwardly of the inside of cover base 104 is a rectangular reservoir member 170 defining with sides 106 and base 104 a chamber 112 having perforated sides 114 with a plurality of horizontal apertures 116, midway of the height of sides 114.

Above and resting on dough stack 102 and below reservoir 170 is an upper sheet of silicone Bakers paper 118.

In operation, dough stack 102 is placed on paper 101 in tray 85 resting on support bars 94. Water is poured into reservoir 82. Upper sheet of paper 118 covers stack 102.

Each sheet of stack 102 has been sprayed or brushed with a coating of canola oil during the building of stack 102.

Upper reservoir 84, containing water, is lowered into lower reservoir 82 over tray 85, by means of handles 120.

The aforesaid baking tray assembly 80, is loaded onto oven support frame 122, either as a single assembly 80, or, typically, as one of a stack of a plurality of assemblies.

The assembly stack may be loaded onto support frame 122 outside or inside oven 93.

During the cooking period of generally 90 minutes at 250° C., (in the range 450° F.-485° F.) water vapour (steam) is generated in both lower and upper reservoirs, 82 and 84, respectively, to provide and maintain the humid atmosphere in the oven chamber and more particularly, around and within the dough stack 102. Notwithstanding the presence of the two sheets of Bakers paper, moisture, surprisingly, percolates to stack 102.

In alternative embodiments, water may be introduced during the cooking period through water conduit inlet 122.

Example 1

Dough according to the invention is made by admixing strong Bakers Flour (20 kg), salt (0.25 kg) and water (10.8 kg) initially at 55-60° C., and mixing these ingredients for 30 minutes in a standard mixing bowl to the desired consistency.

Portions of the dough of approximately 4 kg were transferred from the mixing bowl and sealed in polyethylene bags at a temperature of about 4° C. overnight.

Unfortunately, this prior art semi-mechanized process has little ability to economically produce a stack of pastry for authentic classic samosa that is easy to peel, while retaining the ability to produce crunchy, non-porous and non-greasy samosa, consistently to achieve the quality characteristics of authentic classical samosa.

Each of the dough portions are initially flattened by hand, rolling pin and subsequently fed to a sheeter assembly having a pair of adjustable sheeter rollers for gradually reducing the dough sheet thickness on a conveyor feed line to about 0.5 to 3 mm. The pastry is rolled into spools of about 4-20 m in length and usually 40 cm to 60 cm in width.

The dough sheet is fed from the spool as a single layer onto one or a plurality of baking pans aligned lengthwise, and cut from the spool. This process of feeding the sheet on the pan(s) is repeated to provide a pastry stack of 20-30 layers on each pan.

Each pan is part of a baking tray assembly having a perforated tray upon which the dough sheet rests and which, itself, rests on a lower water reservoir. An upper reservoir rests above the tray. In operation, during the cooking, water evaporates and circulates in the oven to maintain the humidity.

Other examples in the ranges of 62-68% w/w Bakers Flour; 28-37% w/w water and 1-4% w/w salt were used to prepare pastry products in the form of single and multi-folded sheets and samosa shells or wraps.

Although this disclosure has described and illustrated certain preferred embodiments of the invention, it is to be understood that the invention is not restricted to those particular embodiments. Rather, the invention includes all embodiments, which are functional or mechanical equivalence of the specific embodiments and features that have been described and illustrated.

The invention claimed is:

1. An improved method for mass production of an unleavened pastry product from a yeast-free pastry dough consisting of 62-68% w/w flour, 28-37% w/w water, and 1-4% w/w salt, in a convection baking oven having a convection atmosphere, said method comprising cooking said dough in said oven at a cooking temperature for cooking period of time, said method comprising:
    providing a transportable baking pan assembly comprising a baking pan and an upper and a lower water-containing reservoir means for operably releasing water vapor into said convection atmosphere during said cooking and a sheet of silicone baking paper for covering said pastry dough during said cooking period;
    placing said pastry dough in said baking pan of said baking pan assembly, and locating said baking pan between said upper and said lower water-containing reservoir means;
    covering said pastry dough with said sheet of silicone baking paper;
    locating said baking pan assembly within said oven; and
    cooking the pastry dough and maintaining the convection atmosphere at a moist atmosphere for the duration of the cooking time to maintain the moisture content of said pastry product at 28-37% w/w water to mass produce the unleavened pastry product.

2. A method as claimed in claim 1 wherein said moist atmosphere prevents the pastry from losing moisture during a semi-cooked state.

3. A method as claimed in claim 1 wherein said moist atmosphere has at least 50% humidity for the duration of the cooking time.

4. A method as claimed in claim 1 wherein said pastry dough is in the form of a sheet having a thickness selected from 0.2 mm to 3 cm.

5. A method as claimed in claim 4 wherein said sheet has a width selected from 40-60 cm.

6. A method as claimed in claim 4 wherein said pastry dough is in the form of a stack comprising a plurality of said sheets, one upon another, wherein each of said sheets has a thickness selected from 0.2 mm to 3.0 mm.

7. A method as claimed in claim 6 wherein said stack is formed from a single folded sheet wherein said sheet is folded longitudinally upon itself at least once to produce a folded stack.

8. A method as claimed in claim 4 wherein said sheet has a length selected from 10 cm-5 m.

9. A method as claimed in claim 4, wherein said pastry dough sheet is made by a process comprising:
    (i) intimately mixing said pastry dough ingredients to produce said pastry dough;
    (ii) cooling said dough to a temperature selected from 4 to 12° C.;
    (iii) storing said dough in a sealed tempering container at a temperature of less than 10° C. for at least 8 hrs; and
    (iv) rolling and cutting said tempered dough to said sheet of selected dimensions.

10. A method as claimed in claim 9 wherein said tempered dough sheet is at a temperature selected from 2° to 8° C.

11. A method as claimed in claim 9 wherein said sealed tempering container is formed of a plastics material.

12. A method as claimed in claim 9 wherein said admixture consists essentially of the following ingredients in said ratios of 65% w/w flour, 33% w/w water and 2% w/w salt.

13. A method as claimed in claim 12 wherein said flour is a wheat flour.

14. A method as claimed in claim 1 wherein said pastry is a shell or wrap for a samosa.

15. An improved method for mass production of an unleavened pastry product from a yeast-free, edible oil-coated pastry dough, which pastry dough consists of 62-68% w/w flour, 28-37% w/w water, 1-4% w/w salt, and an edible oil coating, in a convection baking oven having a convection atmosphere, said method comprising cooking said yeast free, edible oil-coated pastry dough in said oven at a cooking temperature for cooking period of time, said method comprising:
    providing a transportable baking pan assembly comprising a baking pan and an upper and a lower water-containing reservoir means for operably releasing water vapor into said convection atmosphere during said cooking and a sheet of silicone baking paper for covering said yeast free, edible oil-coated pastry dough during said cooking period;
    preparing said pastry dough;
    coating said pastry dough with said edible oil;
    placing said yeast free, edible oil-coated pastry dough in said baking pan of said baking pan assembly, and locating said baking pan between said upper and said lower water-containing reservoir means;
    covering said yeast free, edible oil-coated pastry dough with said sheet of silicone baking paper;
    locating said baking pan assembly within said oven; and
    cooking said yeast free, edible oil-coated pastry dough while maintaining the convection atmosphere at a moist atmosphere for the duration of the cooking time to maintain the moisture content of said pastry product at 28-37% w/w water to mass produce the unleavened pastry product.

16. A method as claimed in claim 15, wherein said oil is canola.

* * * * *